(12) United States Patent
Flodman et al.

(10) Patent No.: US 8,172,504 B2
(45) Date of Patent: May 8, 2012

(54) HYBRID IMPINGEMENT COOLED AIRFOIL

(75) Inventors: David Allen Flodman, Rowley, MA (US); Jason David Shapiro, Meuthen, MA (US); Robert Francis Manning, Newburyport, MA (US); Mark Douglas Gledhill, South Hamilton, MA (US); Tyler Frederick Hooper, Amesbury, MA (US)

(73) Assignee: General Electric Company, Schenectady, NY (US)

( * ) Notice: Subject to any disclaimer, the term of this patent is extended or adjusted under 35 U.S.C. 154(b) by 1079 days.

(21) Appl. No.: 12/055,101

(22) Filed: Mar. 25, 2008

(65) Prior Publication Data

US 2009/0245999 A1 Oct. 1, 2009

(51) Int. Cl.
*F01D 5/18* (2006.01)
(52) U.S. Cl. ...................................... 415/115; 416/96 A
(58) Field of Classification Search .................. 416/96 A
See application file for complete search history.

(56) References Cited

U.S. PATENT DOCUMENTS

| | | | |
|---|---|---|---|
| 5,120,192 A | | 6/1992 | Ohtomo et al. |
| 5,207,556 A | * | 5/1993 | Frederick et al. ............. 415/115 |
| 6,416,284 B1 | | 7/2002 | Demers et al. |
| 6,874,988 B2 | * | 4/2005 | Tiemann ........................ 415/115 |
| 2003/0131980 A1 | | 7/2003 | DeMarche et al. |
| 2003/0180141 A1 | | 9/2003 | Kress et al. |
| 2004/0022630 A1 | | 2/2004 | Tiemann |
| 2004/0170498 A1 | * | 9/2004 | Peterman et al. ........... 416/97 R |

FOREIGN PATENT DOCUMENTS

JP 03264706 A * 11/1991

* cited by examiner

*Primary Examiner* — Richard Edgar
(74) *Attorney, Agent, or Firm* — David J. Clement, Esq.; Trego, Hines & Ladenheim, PLLC

(57) ABSTRACT

A turbine nozzle for a gas turbine engine includes: (a) spaced-apart arcuate inner and outer bands; (b) a hollow, airfoil-shaped turbine vane extending between the inner and outer bands, the interior of the vane defining at least a forward cavity and a mid-cavity positioned aft of the forward cavity; (c) a hollow impingement insert received inside the mid-cavity, the impingement insert having walls which are pierced with at least one impingement cooling hole; (d) a passage in the turbine vane at a radially outer end of the forward cavity adapted to be coupled to a source of cooling air; and (e) a passage in the inner band in fluid communication with a radially inner end of the forward cavity and a radially inner end of the impingement insert.

16 Claims, 4 Drawing Sheets

US 8,172,504 B2

HYBRID IMPINGEMENT COOLED AIRFOIL

BACKGROUND OF THE INVENTION

This invention relates generally to gas turbine engine turbines and more particularly to methods for cooling turbine nozzles of such engines.

A gas turbine engine includes a turbomachinery core having a high pressure compressor, a combustor, and a high pressure or gas generator turbine in serial flow relationship. The core is operable in a known manner to generate a primary gas flow. In a turbojet or turbofan engine, the core exhaust gas is directed through an exhaust nozzle to generate thrust. A turboshaft engine uses a low pressure or "work" turbine downstream of the core to extract energy from the primary flow to drive a shaft or other mechanical load.

The gas generator turbine includes annular arrays of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life. Typically, the air used for cooling is extracted from one or more points in the compressor. These bleed flows represent a loss of net work output and/or thrust to the thermodynamic cycle. They increase specific fuel consumption (SFC) and are generally to be avoided as much as possible.

Various methods are known for cooling turbine components including film cooling, internal convection, and impingement. Impingement is known to be a particularly effective cooling method and is frequently used in large turbine engines where the engine core flow is substantial. However, higher turbine stages in small turboshaft and turboprop engines stage do not typically employ impingement cooling of the airfoil because there is either not enough cooling air or enough supply pressure available. Instead internal features like turbulators or pins provide the necessary convection heat transfer enhancements.

BRIEF SUMMARY OF THE INVENTION

These and other shortcomings of the prior art are addressed by the present invention, which provides a turbine nozzle cooled with a combination of impingement and convection cooling.

According to one aspect of the invention, a turbine nozzle for a gas turbine engine includes: (a) spaced-apart arcuate inner and outer bands; (b) a hollow, airfoil-shaped turbine vane extending between the inner and outer bands, the interior of the vane defining at least a forward cavity and a mid-cavity positioned aft of the forward cavity; (c) a hollow impingement insert received inside the mid-cavity, the impingement insert having walls which are pierced with at least one impingement cooling hole; (d) a passage in the turbine vane at a radially outer end of the forward cavity adapted to be coupled to a source of cooling air; and (e) a passage in the inner band in fluid communication with a radially inner end of the forward cavity and a radially inner end of the impingement insert.

According to another aspect of the invention, a method is provided for cooling a turbine nozzle of a gas turbine engine which includes: spaced-apart arcuate inner and outer bands; a hollow, airfoil-shaped turbine vane extending between the inner and outer bands, the interior of the vane defining at least a forward cavity and a mid-cavity positioned aft of the forward cavity; and a hollow impingement insert received inside the mid-cavity, the impingement insert having walls which are pierced with at least one impingement cooling hole. The method includes: (a) supplying cooling air to the forward cavity at a radially outer end thereof; (b) subsequently passing at least a portion of the cooling air entering the forward cavity from a radially inner end of the forward cavity to the radially inner end of the impingement insert; and (c) ejecting cooling air through the impingement cooling holes to cool the mid-cavity.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
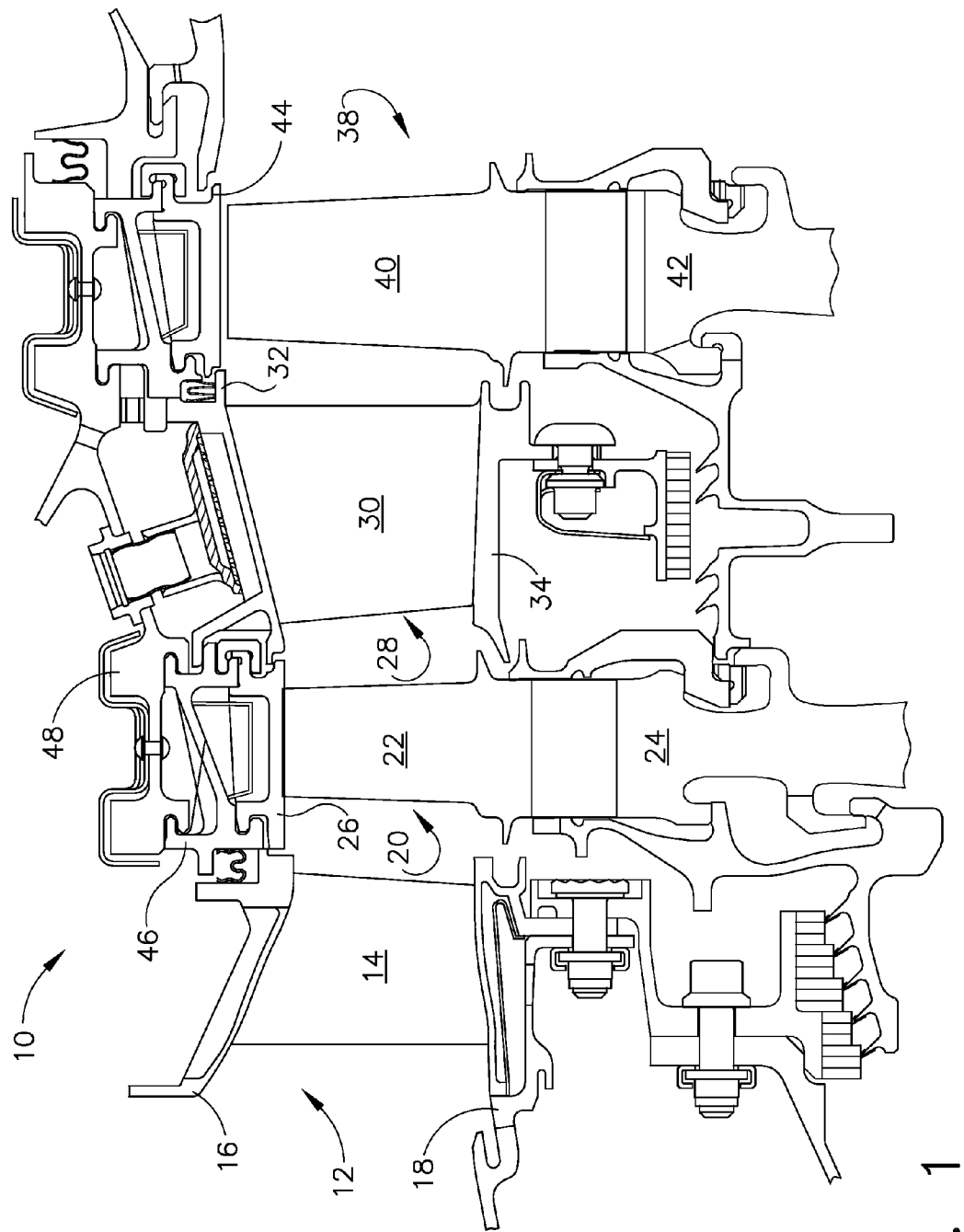
FIG. 1 is a schematic cross-sectional view of a turbine section constructed in accordance with the present invention.

Referring to the drawings wherein identical reference numerals denote the same elements throughout the various views, FIG. 1 depicts a portion of a gas generator turbine 10, which is part of a gas turbine engine of a known type. The function of the gas generator turbine 10 is to extract energy from high-temperature, pressurized combustion gases from an upstream combustor (not shown) and to convert the energy to mechanical work, in a known manner. The gas generator turbine 10 drives an upstream compressor (not shown) through a shaft so as to supply pressurized air to the combustor.

In the illustrated example, the engine is a turboshaft engine and a work turbine would be located downstream of the gas generator turbine 10 and coupled to an output shaft. However, the principles described herein are equally applicable to turboprop, turbojet, and turbofan engines, as well as turbine engines used for other vehicles or in stationary applications.

The gas generator turbine 10 includes a first stage nozzle 12 which comprises a plurality of circumferentially spaced airfoil-shaped hollow first stage vanes 14 that are supported between an arcuate, segmented first stage outer band 16 and an arcuate, segmented first stage inner band 18. The first stage vanes 14, first stage outer band 16 and first stage inner band 18 are arranged into a plurality of circumferentially adjoining nozzle segments that collectively form a complete 360° assembly. The first stage outer and inner bands 16 and 18 define the outer and inner radial flowpath boundaries, respectively, for the hot gas stream flowing through the first stage nozzle 12. The first stage vanes 14 are configured so as to optimally direct the combustion gases to a first stage rotor 20.

The first stage rotor 20 includes a array of airfoil-shaped first stage turbine blades 22 extending outwardly from a first stage disk 24 that rotates about the centerline axis of the engine. A segmented, arcuate first stage shroud 26 is arranged so as to closely surround the first stage turbine blades 22 and thereby define the outer radial flowpath boundary for the hot gas stream flowing through the first stage rotor 20.

A second stage nozzle 28 is positioned downstream of the first stage rotor 20, and comprises a plurality of circumferentially spaced airfoil-shaped hollow second stage vanes 30 that are supported between an arcuate, segmented second stage outer band 32 and an arcuate, segmented second stage inner band 34. The second stage vanes 30, second stage outer band 32 and second stage inner band 34 are arranged into a plurality of circumferentially adjoining nozzle segments 36 (see FIG. 2) that collectively form a complete 360° assembly. The second stage outer and inner bands 32 and 34 define the outer and inner radial flowpath boundaries, respectively, for the hot gas stream flowing through the second stage turbine nozzle 34. The second stage vanes 30 are configured so as to optimally direct the combustion gases to a second stage rotor 38.

The second stage rotor 38 includes a radial array of airfoil-shaped second stage turbine blades 40 extending radially outwardly from a second stage disk 42 that rotates about the centerline axis of the engine. A segmented arcuate second stage shroud 44 is arranged so as to closely surround the second stage turbine blades 40 and thereby define the outer radial flowpath boundary for the hot gas stream flowing through the second stage rotor 38.

The segments of the first stage shroud 26 are supported by an array of arcuate first stage shroud hangers 46 that are in turn carried by an arcuate shroud support 48, for example using the illustrated hooks, rails, and C-clips in a known manner. The second stage nozzle 28 is supported in part by mechanical connections to the first stage shroud hangers 46 and the shroud support 48.

Figure 2:
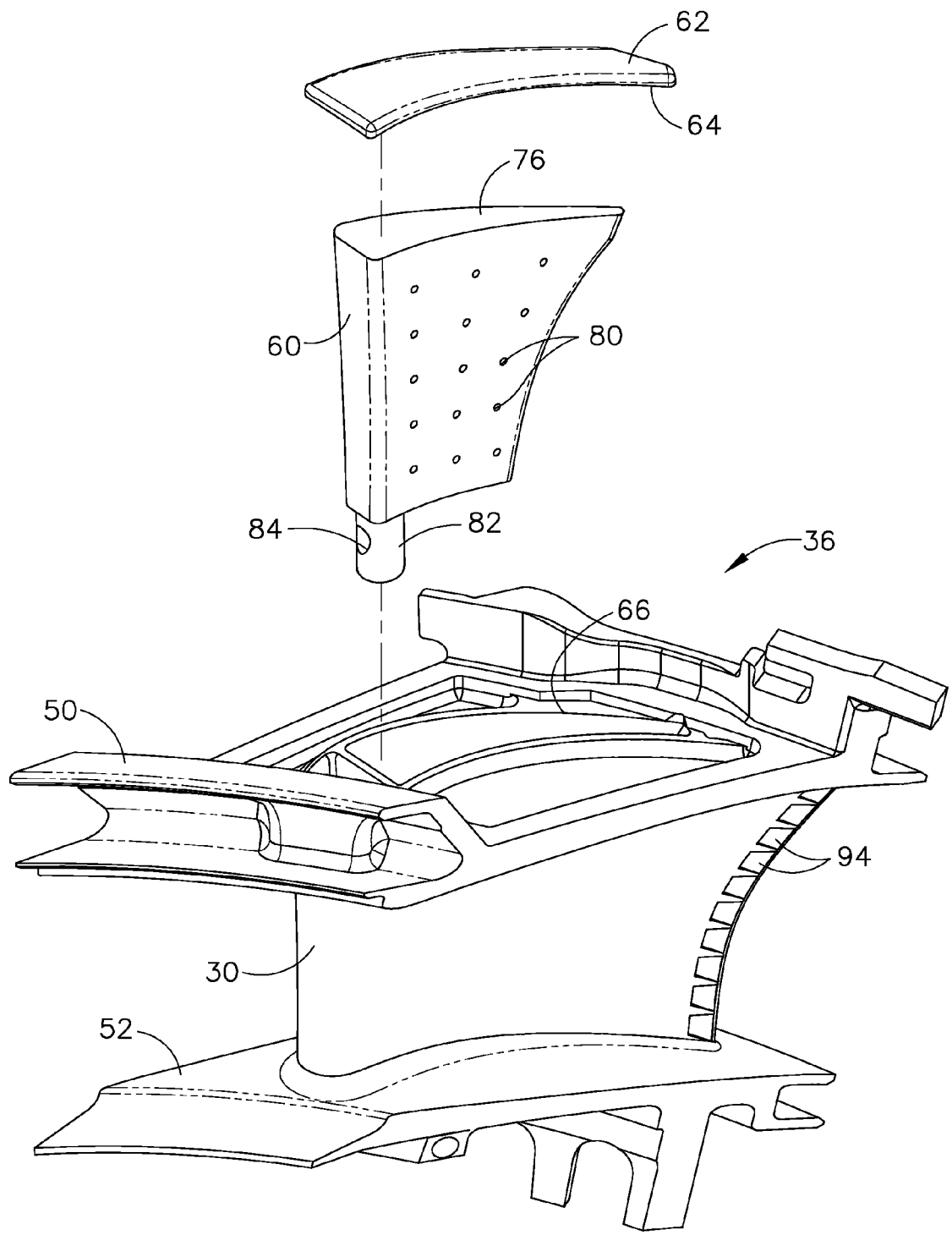
FIG. 2 is an exploded perspective view of a turbine nozzle shown in FIG. 1.
Figure 3:
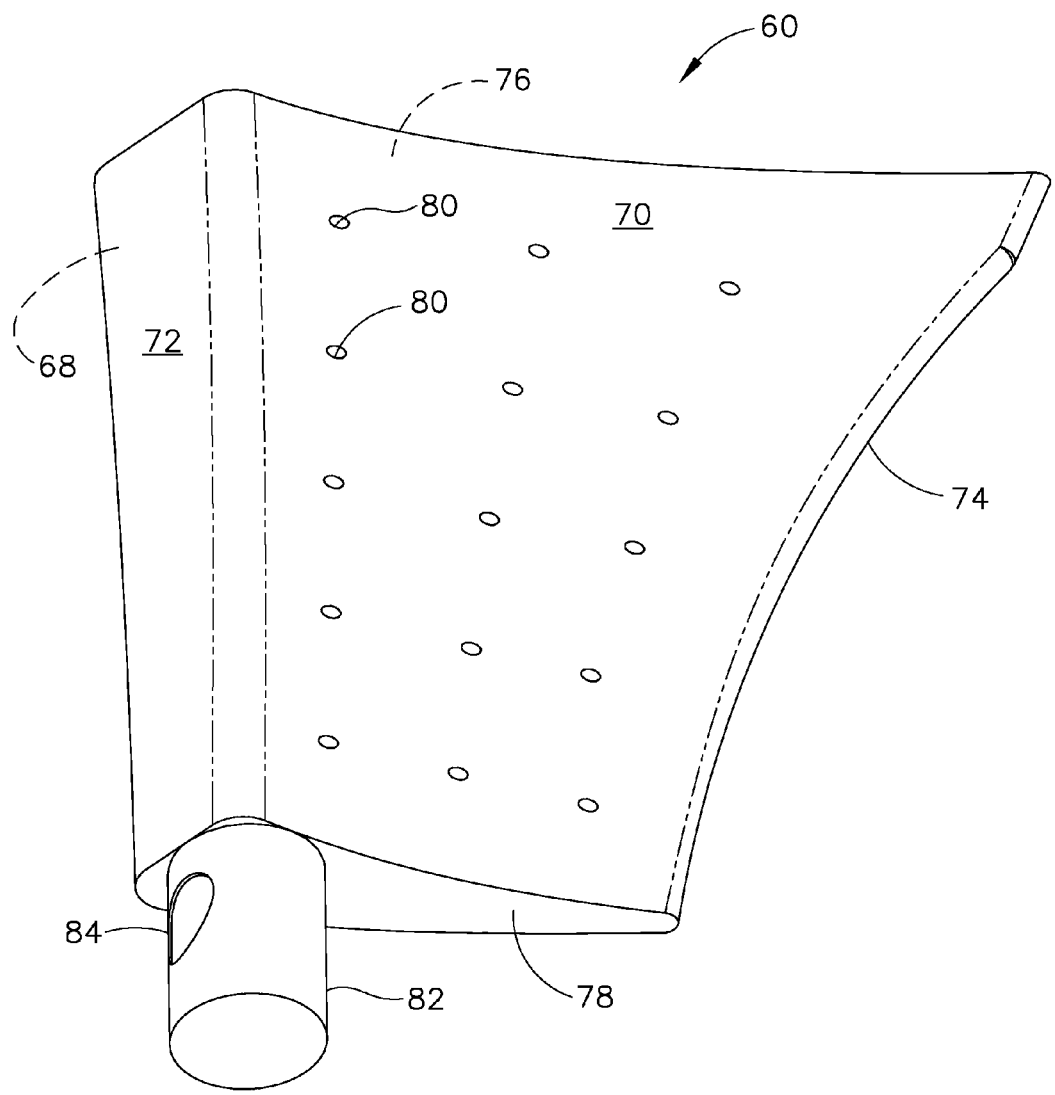
FIG. 3 is a perspective view of an impingement insert shown in FIG. 2.
Figure 4:
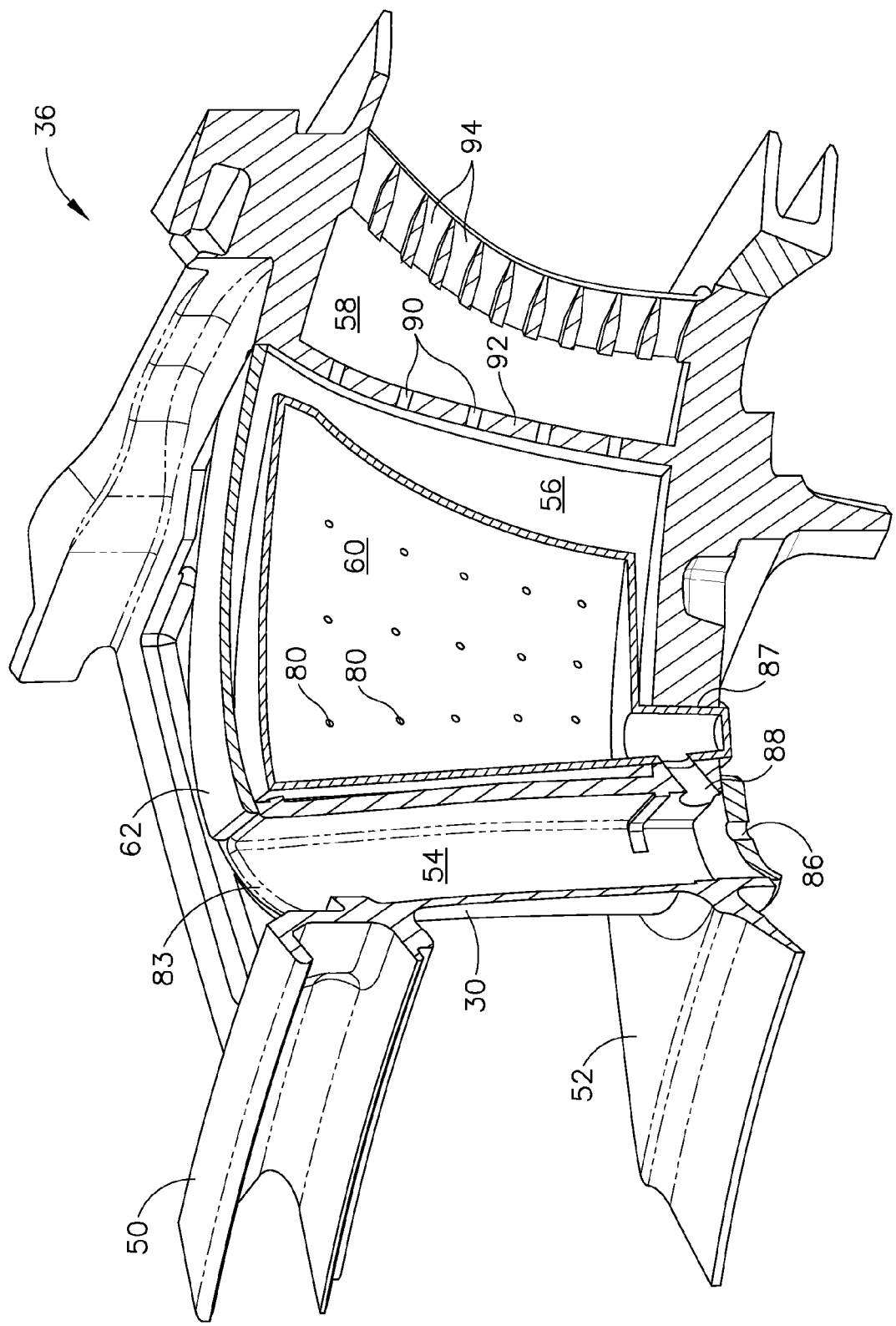
FIG. 4 is a cutaway view of an assembled turbine nozzle and insert.

FIGS. 2-4 illustrate the construction of the second stage nozzle 28 in more detail. FIG. 2 shows an individual nozzle segment 36 which is a "singlet" casting. It incorporates a segment 50 of the outer band 32, a segment 52 of the inner band 34, and a hollow second stage vane 30. The interior of the second stage vane 30 is divided into a forward cavity 54, a mid-cavity 56, and a rear cavity 58. An impingement insert 60 is received in the mid-cavity 56. The radially outer end of the second stage vane 30 is closed by a cover 62. The cover 62 is a plate-like structure which has a lower peripheral edge 64 that mates with an opening 66 at the radially outer end of the second stage vane 30.

FIG. 3 shows the impingement insert 60 in more detail. The impingement insert 60 is a hollow, roughly airfoil-shaped structure, and has pressure and suction side walls 68 and 70 that extend between a leading edge 72 and a trailing edge 74. The impingement insert 60 is closed off by a tip wall 76 (see FIG. 2) and a root wall 78. The walls of the impingement insert 60 are perforated by a plurality of impingement holes 80 of a known type which are sized to direct impingement jets against the walls of the mid-cavity 56. An inlet tube 82 with a closed distal end protrudes radially inward from the root wall 78. An inlet hole 84 is formed in the sidewall of the inlet tube 82.

FIG. 4 shows in more detail how the impingement insert 60 is mounted in the second stage vane 30. The impingement insert 60 is received in the mid-cavity 56. Because the impingement insert 60 and the mid-cavity 56 both have larger cross-sectional areas at their outer ends than at their inner ends, the impingement insert 60 is installed from the outer end of the second stage vane 30. Its inner end is secured to the inner band segment 52, for example by a braze joint between the inlet tube 82 and the opening 87 in the inner band segment 52. Welding or mechanical fasteners could also be used in place of the brazed joint, with some means of sealing. The outer end of the impingement insert 60 is free to move radially in or out as a result of thermal expansion or contraction during operation. One or more pads or protrusions (not shown) are provided as part of, or attached to, the impingement insert 60 and/or the walls of the mid-cavity 56 in order to locate the impingement insert and restrain its motion in the lateral and fore-and-aft directions.

Securing the impingement insert 60 at the inner end in this manner will effectively seal the cooling air entrance to the impingement insert 60 while allowing the impingement insert 60 to be installed from the radially outer end of the second stage vane 30. This configuration allows maximum cooling air flow to be used in cooling the forward cavity 54 of the second stage vane 20, and then utilizes the most effective convective cooling method to cool the mid-cavity 56 with the smallest amount of cooling flow possible.

In operation, compressor discharge air (CDP), at the highest pressure in the compressor, or another suitable cooling air flow, is ducted to a passage 83 at the radially outer end of the second stage vane 30. It then flows radially inward through the forward cavity 54 where it cools the turbine vane 30 by convection. Although not shown, heat-transfer-enhancing structures such as fins, pins, turbulence promoters ("turbulators") may be provided in the forward cavity. A portion of the air exits the forward cavity through an purge hole 86 extending through the inner band segment 52. In the illustrated example, the purge hole 86 is sized such that about one-half of the mass flow entering the turbine vane 30 passes through the purge hole 86, and is used to purge the rotor cavity of the turbine 10. The remaining flow passes through a metering hole 88 and enters the impingement insert 60 through the inlet hole 84 in the inlet tube 82. It exits the impingement insert 60 through impingement holes 80 as jets that cool the mid-cavity 56. Next, the air exits the mid-cavity 56 through crossover holes 90 in the wall 92 between the mid-cavity 56 and the rear cavity 58. It then cools the rear cavity 58 by convection. Although not shown, heat-transfer-enhancing structures such as fins, pins, turbulence promoters ("turbulators") may be provided in the rear cavity 58. The spent cooling air exits the rear cavity 58 through trailing edge passages 94, such as the illustrated slots, or through film cooling holes (not shown) in the second stage vane 30.

The turbine nozzle cooling configuration described herein is particularly useful when high pressure cooling air is available, but not in sufficient quantities to cool the entire nozzle with impingement. The design described herein combines turbulated lead edge cooling with mid-chord impingement and a warm bridge trailing edge to optimize the cooling and use of available air and pressure. The combination of these technologies enables a design that meets temperature goals which could not otherwise be met without higher cooling flow rates or extremely high turbulator enhancements.

The foregoing has described cooling arrangements for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A turbine nozzle for a gas turbine engine, comprising:
   (a) spaced-apart arcuate inner and outer bands;
   (b) a hollow, airfoil-shaped turbine vane extending between the inner and outer bands, the interior of the vane defining at least a forward cavity and a mid-cavity positioned aft of the forward cavity, wherein the mid-cavity has a first cross-sectional area at a radially inner end thereof, and a second cross-sectional area at a radially outer end thereof, wherein the second cross-sectional area is substantially greater than the first cross-sectional area;
(c) a hollow impingement insert received inside the mid-cavity, the impingement insert having walls which are pierced with at least one impingement cooling hole;
(d) a passage in the turbine vane at a radially outer end of the forward cavity adapted to be coupled to a source of cooling air; and
(e) a passage in the inner band in fluid communication with a radially inner end of the forward cavity and a radially inner end of the impingement insert.

2. The turbine nozzle of claim 1 wherein the interior of the turbine vane further defines a rear cavity positioned aft of the mid-cavity, the rear cavity being in fluid communication with the mid-cavity.

3. The turbine nozzle of claim 2 wherein the turbine vane includes a plurality of trailing edge cooling passages in communication with the rear cavity.

4. The turbine nozzle of claim 1 wherein the radially inner end of the impingement insert is secured to the turbine vane, and a radially outer end of the impingement insert is free to move in a radial direction.

5. The turbine nozzle of claim 4 wherein the inner end of the impingement insert is brazed to the inner band.

6. The turbine nozzle of claim 1 wherein a radially outer end of the turbine vane is closed off by a cover secured to a peripheral wall of the turbine vane.

7. The turbine nozzle of claim 1 wherein the impingement insert includes a radially inwardly-extending inlet tube which is received in an opening in the inner band.

8. The turbine nozzle of claim 1 wherein a purge hole is formed through the inner band in communication with a radially inner end of the forward cavity.

9. A method of cooling a turbine nozzle of a gas turbine engine which includes:
spaced-apart arcuate inner and outer bands;
a hollow, airfoil-shaped turbine vane extending between the inner and outer bands, the interior of the vane defining at least a forward cavity and a mid-cavity positioned aft of the forward cavity, wherein the mid-cavity has a first cross-sectional area at a radially inner end thereof, and a second cross-sectional area at a radially outer end thereof, wherein the second cross-sectional area is substantially greater than the first cross-sectional area; and
a hollow impingement insert received inside the mid-cavity, the impingement insert having walls which are pierced with at least one impingement cooling hole, the method comprising:
(a) supplying cooling air to the forward cavity at a radially outer end thereof;
(b) subsequently passing at least a portion of the cooling air entering the forward cavity from a radially inner end of the forward cavity to the radially inner end of the impingement insert; and
(c) ejecting cooling air through the impingement cooling holes to cool the mid-cavity.

10. The method of claim 9 wherein the interior of the turbine vane further defines a rear cavity positioned aft of the mid-cavity, the rear cavity being in fluid communication with the mid-cavity.

11. The method of claim 10 wherein the turbine vane includes a plurality of trailing edge cooling passages in communication with the rear cavity.

12. The method of claim 9 wherein a radially inner end of the impingement insert is secured to the turbine vane, and a radially outer end of the impingement insert is free to move in a radial direction.

13. The method of claim 9 wherein the inner end of the impingement insert is brazed to the inner band.

14. The method of claim 9 wherein a radially outer end of the turbine vane is closed off by a cover secured to a peripheral wall of the turbine vane.

15. The method of claim 9 wherein the impingement insert includes a radially inwardly-extending inlet tube which is received in an opening in the inner band.

16. The method of claim 9 wherein a purge hole is formed through the inner band in communication with a radially inner end of the forward cavity, and a portion of the cooling air entering the forward cavity exits the purge hole.

* * * * *